(12) United States Patent
Longworth et al.

(10) Patent No.: US 7,270,341 B2
(45) Date of Patent: Sep. 18, 2007

(54) VEHICLE SUSPENSION WITH IMPROVED RADIUS ARM TO AXLE ATTACHMENT

(75) Inventors: Paul Longworth, Ann Arbor, MI (US); Harry Hess, Dearborn, MI (US); John Stanley, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 510 days.

(21) Appl. No.: 10/710,951

(22) Filed: Aug. 13, 2004

(65) Prior Publication Data
US 2006/0033298 A1    Feb. 16, 2006

(51) Int. Cl.
*B60G 1/04* (2006.01)
(52) U.S. Cl. .................................. 280/124.11
(58) Field of Classification Search ........... 280/124.11, 280/124.128, 124.129, 124.132, 124.133, 280/124.134
See application file for complete search history.

(56) References Cited

U.S. PATENT DOCUMENTS

| 4,415,178 | A |   | 11/1983 | Hatsushi et al. |
|---|---|---|---|---|
| 4,557,501 | A |   | 12/1985 | Farleigh |
| 4,750,757 | A | * | 6/1988 | Long .................... 280/124.106 |
| 4,754,991 | A |   | 7/1988 | Jordan |
| 4,953,278 | A |   | 9/1990 | Specktor et al. |
| 5,002,305 | A |   | 3/1991 | Raidel |
| 5,037,126 | A |   | 8/1991 | Gottschalk et al. |
| 5,375,871 | A |   | 12/1994 | Mitchell et al. |
| 5,380,036 | A |   | 1/1995 | Perkins et al. |
| 5,639,110 | A |   | 6/1997 | Pierce et al. |
| 5,651,561 | A |   | 7/1997 | Tandy, Jr. et al. |
| 6,039,336 | A |   | 3/2000 | Frey |
| 6,460,869 | B1 | * | 10/2002 | Tremouilles ......... 280/124.116 |

FOREIGN PATENT DOCUMENTS

JP        62247914 A    * 10/1987

* cited by examiner

*Primary Examiner*—Faye M. Fleming
(74) *Attorney, Agent, or Firm*—Frederick Owens; Brooks Kushman P.C.

(57) ABSTRACT

A vehicle suspension system having radius arms that are connected to axle brackets through vertically arranged bushings. A third link of the suspension system is a track bar that connects one end of the axle to a laterally spaced point on the frame of the vehicle. The radius arms are sheet metal fabricated members that are assembled in a clam shell arrangement.

16 Claims, 3 Drawing Sheets

VEHICLE SUSPENSION WITH IMPROVED RADIUS ARM TO AXLE ATTACHMENT

BACKGROUND OF THE INVENTION

1. Field of the Invention

The present invention relates to the structure of a three link vehicle suspension system including a pair of radius arms and a track bar.

2. Background Art

Vehicle suspension systems connect an axle to a frame of a vehicle. Suspension system components typically include shock absorbers, springs, torsion bars, and other components. Vehicle suspensions are dynamic systems that move in response to braking, turning, acceleration and road induced impacts. The vehicle must be designed to allow for substantial movement of suspension system components relative to each other and to the other vehicle components.

Four and five link suspension systems have been developed that offer some advantages in regard to vehicle design. However, these systems have pairs of upper and lower arms that increase the cost and part count of the suspension systems. In addition, four and five link systems generally require a greater number of expensive bushings.

One example of a heavy duty suspension system is a three link suspension system that may include two radius arms and a track bar. The radius arms connect through rubber bushings to the frame and normally extend below the axle. Radius arms generally connect to axle mounting structures that are located fore and aft of the axle. The track bar, also known as a Panhard rod, is a lateral restraint which may be replaced with a Watt's linkage that laterally connects to the axle and the frame through rubber bushings or an equivalent joint such as a spherical joint. The track bar and steering links may be located on the opposite side of the axle from the side on which the radius arms are connected to the frame. Any portion of the radius arms that extend beyond the axle to the opposite side may complicate suspension system design and create interference with the steering linkage.

Radius arms must be strong and durable to withstand impacts and stresses encountered in normal and extreme driving conditions. Suspension systems must provide acceptable ride quality and minimize harshness. Rubber bushings are used to absorb vibration and soften the ride of a vehicle. Bushings may be selected to tune roll stiffness, caster stiffness, caster change, steering, and tracking performance characteristics.

Normally, the longer the radius arm, the lower the amount of brake anti-dive. Longer radius arms also tend to reduce the caster angle sensitivity relative to suspension deflection and ride height.

The roll stiffness of a front suspension linkage may be impacted by bushing radial stiffness, bushing separation distance, axle tube torsional stiffness, radius arm bending stiffness, radius arm lateral separation and the radius arm length. While all of the above factors may impact roll stiffness, generally the longer the radius arm, the lower the roll stiffness and the stiffer bushings must be to compensate.

Bushings used in suspension systems may exhibit different loading characteristics. Bushings may exhibit conical loading, particularly if the bushings are installed fore-and-aft of the axle as in typical suspension system designs. Radial loading of bushings is generally preferred because it is more predictable and maximizes bushing performance characteristics.

The above problems and challenges are addressed by applicants' invention as summarized below.

SUMMARY OF THE INVENTION

According to one aspect of the present invention, a vehicle suspension system subassembly is provided for supporting a vehicle on an axle. The subassembly comprises right and left radius arms, each of which have a first end secured to a frame of the vehicle and a second end forming a bracket on which first and second bushings are secured. The first and second bushings are arranged in a vertically spaced relationship relative to each other so that both of the bushings are disposed on the first side of the axle. A right axle connection structure is connected to a right side of the axle and secured to the first and second bushings of the right radius arm. A left axle connection structure is connected to the left side of the axle and is secured to the first and second bushings of the left radius arm. A track bar extends laterally from the axle to the frame of the vehicle from a location near a first end side of the axle to a location near a second end side of the axle.

According to other aspects of the invention as they relate to the vehicle suspension system subassembly, the radius arms may each include first and second cup-shaped elongated half arms that are assembled together in a clamshell manner to define a hollow elongated arm. The brackets on the second ends of the right and left radius arms may include one flange on a first half arm and one flange on the second half arm. The track bar may be disposed on the opposite longitudinal side of the axle from the first side thereof. The first end of the track bar is connected to the frame through a first bushing, while the second end of the track bar is connected to the axle through a second set of bushings.

According to another aspect of the present invention, an improved radius arm is provided for a front axle suspension system of a vehicle. The vehicle has an axle that is connected to a frame element of the vehicle that is spaced rearward relative to the axle. The axle has a connector extending rearwardly from the axle and a receptacle in which a pair of bushings are retained in a vertically aligned relationship behind the axle. The bushings each have a central bore through which a fastener is inserted. The radius arm comprises an elongated arm having a forward end on which an axle connector is provided. The axle connector supports a pair of bushings that are assembled to upper and lower vertically aligned fasteners. The fasteners extend through the fastener receptacle bores in the bushings. A frame bushing is provided at the rearward end of the arm and is adapted to connect the rearward end of the arm to the frame of the vehicle.

According to other aspects of the invention as it relates to the radius arm structure, the elongated arm may be formed as a two-part clamshell structure fabricated as sheet metal half shells that are welded together to form a hollow space within the arm. The half shells are welded together about their outer edges to seal the hollow space within the arm.

According to another aspect of the invention, a combination comprising an axle and a radius arm is provided for a vehicle. The axle has a central axis and a connection structure to which the radius link is secured. The radius link comprises an elongated body connected at a first end to the frame and to an axle connector at a second end. A pair of bushings are secured to the connection structure of the axle and to the axle connector at the second end of the body. The bushings are disposed on the same fore and aft side of the central axis of the axle and are vertically spaced relative to each other.

According to other aspects of the invention relating to the combination of an axle and radius arm, the body and axle connector may be disposed on one side of the axle so that they do not extend longitudinally beyond the central axis of the axle. The bushings may be connected to the axle connector by fasteners that are oriented parallel to the central axis of the axle and are vertically aligned with one another so that one of the bushings is disposed at a greater height than the central axis and the other bushing is disposed at a lower height than the central axis.

The bushings may have a central bore through which a fastener is inserted to secure the axle connector to the connection structure of the axle. The central bores are parallel to the central axis of the axle and form a triangular supporting array on one side of the axle wherein no part of the triangular supporting array extends directly below or directly above the central axis. A frame connector bushing has a central bore for receiving a fastener that is adapted to connect the first end of the body to the frame of the vehicle. The bushings may be connected to the axle connector by fasteners that are oriented parallel to the central axis of the axle.

The frame connector may include a bushing that has a central bore for receiving a fastener that is adapted to connect the first end of the body to the frame of the vehicle. The central axis of the axle, the fasteners that connect the resilient bushings to the axle connector and the central bore of the resilient bushing that connects the first end of the body to the frame are preferably arranged in a quadrilateral array on one side of the axle.

These and other features and aspects of the present invention will be better understood in view of the attached drawings and following detailed description of the invention.

DETAILED DESCRIPTION OF THE PREFERRED EMBODIMENT(S)

Figure 1:
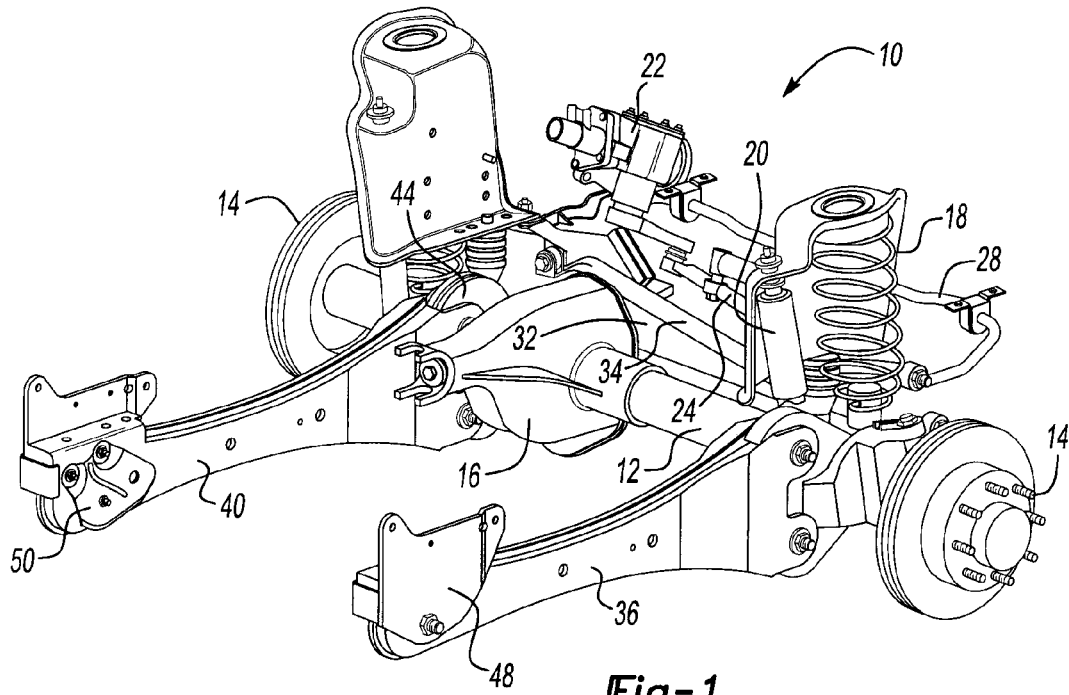
FIG. 1 is a rear side perspective view of a front suspension system for a four wheel drive vehicle.
Figure 2:
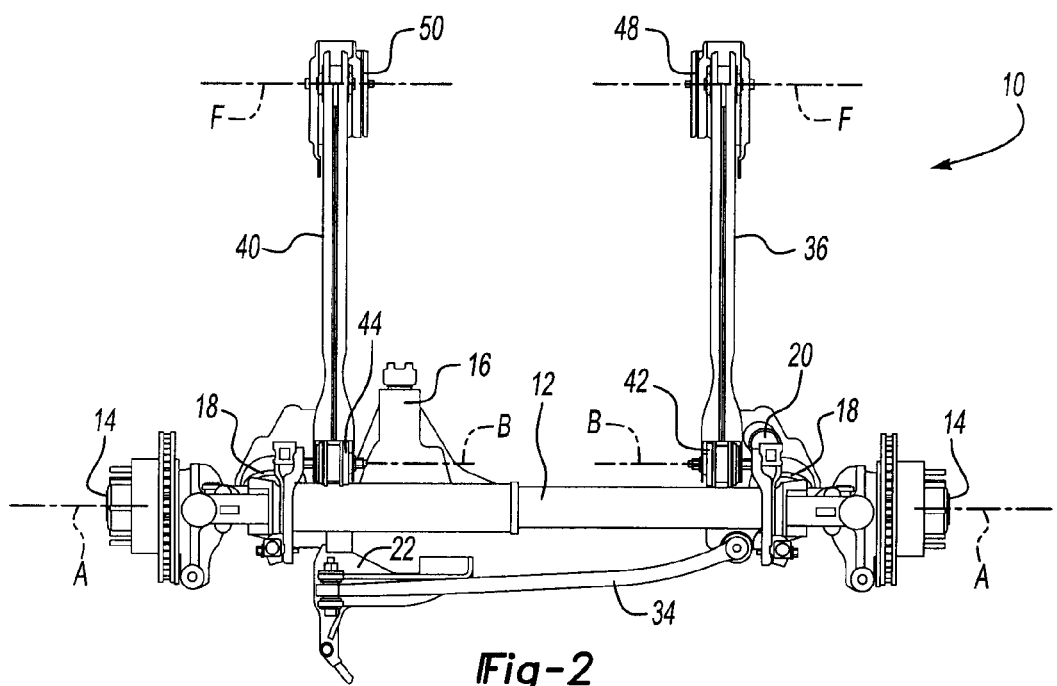
FIG. 2 is a bottom plan view thereof.

Referring to FIGS. 1 and 2, a front axle suspension assembly 10 is shown to include a front axle tube 12 that extends between the front wheel mounts 14. It should be understood that the front axle suspension assembly 10 is described as being exemplary and it should not be understood to limit the construction of the claims of this application to front axles since the invention is equally applicable with a reversed fore-and-aft orientation to rear axle suspension assemblies. The suspension assembly 10 also includes a ring/pinion housing 16 to which a drive shaft (not shown) of a four wheel drive vehicle may be connected. The suspension assembly 10 also includes a set of springs 18 and shock absorbers 20 that are used to provide suspension damping, as is well known in the art. A steering gear 22 is shown above the front axle suspension assembly 10 that functions to steer the front wheels (not shown). A drag link 24, and stabilizer bar 28 are also provided forward of the front axle 12. In addition, a tie rod 32 is provided that links the wheel mounts 14 together.

A three link suspension subassembly is defined by a Panhard rod 34, a right radius arm 36 and a left radius arm 40. Right radius arm 36 is connected to the axle 12 by an axle bushing assembly 42. The opposite end of the right radius arm is connected by a frame bushing assembly 48 to the frame (not shown) of the vehicle (not shown). The left radius arm 40 is connected to the ring/pinion housing 16 by a housing bushing assembly 44. The left radius arm 40 is connected to the vehicle frame by frame bushing assembly 50 that is located at the opposite end of the left radius arm 40 from the housing bushing assembly 44.

Referring to FIG. 2, the axle tube 12 has a central axis A. The bushings connecting the radius arm 36 to the angle tube 12 each have a central bore with an axis B. The bushing that connects the radius arm 36 to the frame has an axis F.

Figure 3:
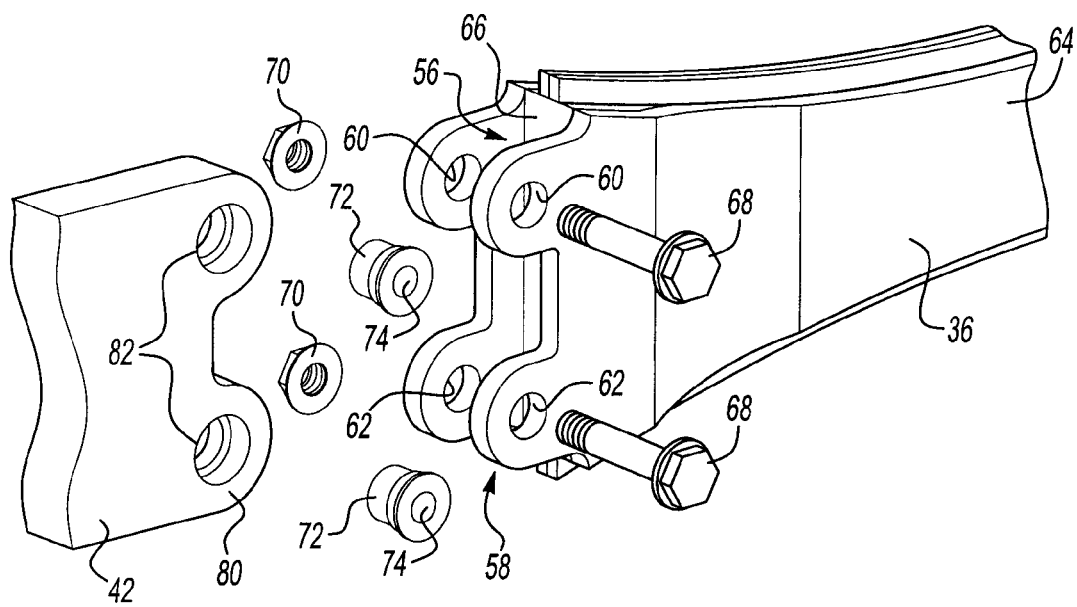
FIG. 3 is a fragmentary exploded perspective view of an axle bracket, radius arm and bushing.
Figure 4:
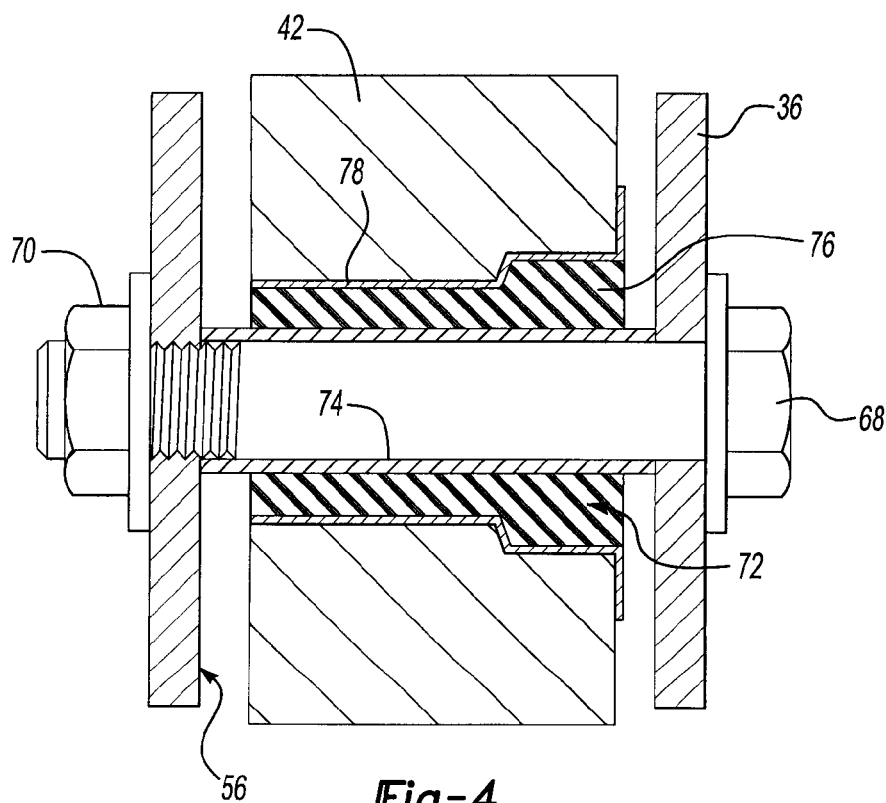
FIG. 4 is a partial cross-section view of a side of the block bushing assembled to an axle bracket, radius arm, clevis and carriage bolt fastener.

Referring to FIGS. 3 and 4, the connecting elements of the right radius arm 36 and radius arm axle bushing assembly 42 are shown in greater detail. A clevis 56 is formed on the forward end 58 of the right radius arm 36. Upper fastener bosses 60 and lower fastener bosses 62 are both located on the same side, that is the rearward side of the front axle tube 12. The fastener bosses 60 and 62 may also be described as being vertically aligned. However, it should be understood that vertical alignment would not require an exact vertical relationship, but should be construed such that the upper fastener bosses 60 are generally above the lower fastener bosses 62.

The radius arm 36 includes an inner shell 64 and an outer shell 66. The inner and outer shells 64 and 66 are separately formed in a sheet metal forming operation and are mated together in a clamshell fashion. The inner and outer shells 64 and 66 may be welded together about their periphery to provide a strong, sealed structure.

A carriage bolt 68 and nut 70 is inserted though a sleeve that lines a central bore 74 of silent block bushing 72. Silent block bushing 72 includes a rubber core 76 though which central bore 74 is formed. An outer shell 78 is provided around the rubber core 76. A flange 80 of the radius arm axle bushing 42 defines a bushing receptacle bore 82. The bushings 72 are each received in one of the bushing receptacle bores 82 with the outer shell 78 nesting within the bushing receptacle bore 82. Each of the carriage bolts 68 extends though one of the fastener bosses 60, 62 and though the central bore 74 of the bushing 72. The bushing 72 is retained within the clevis 56 of the radius arm 36. The bushing 72 connects the axle bushing assembly 42 to the radius arm 36 with a specified bushing rate.

Figure 5:
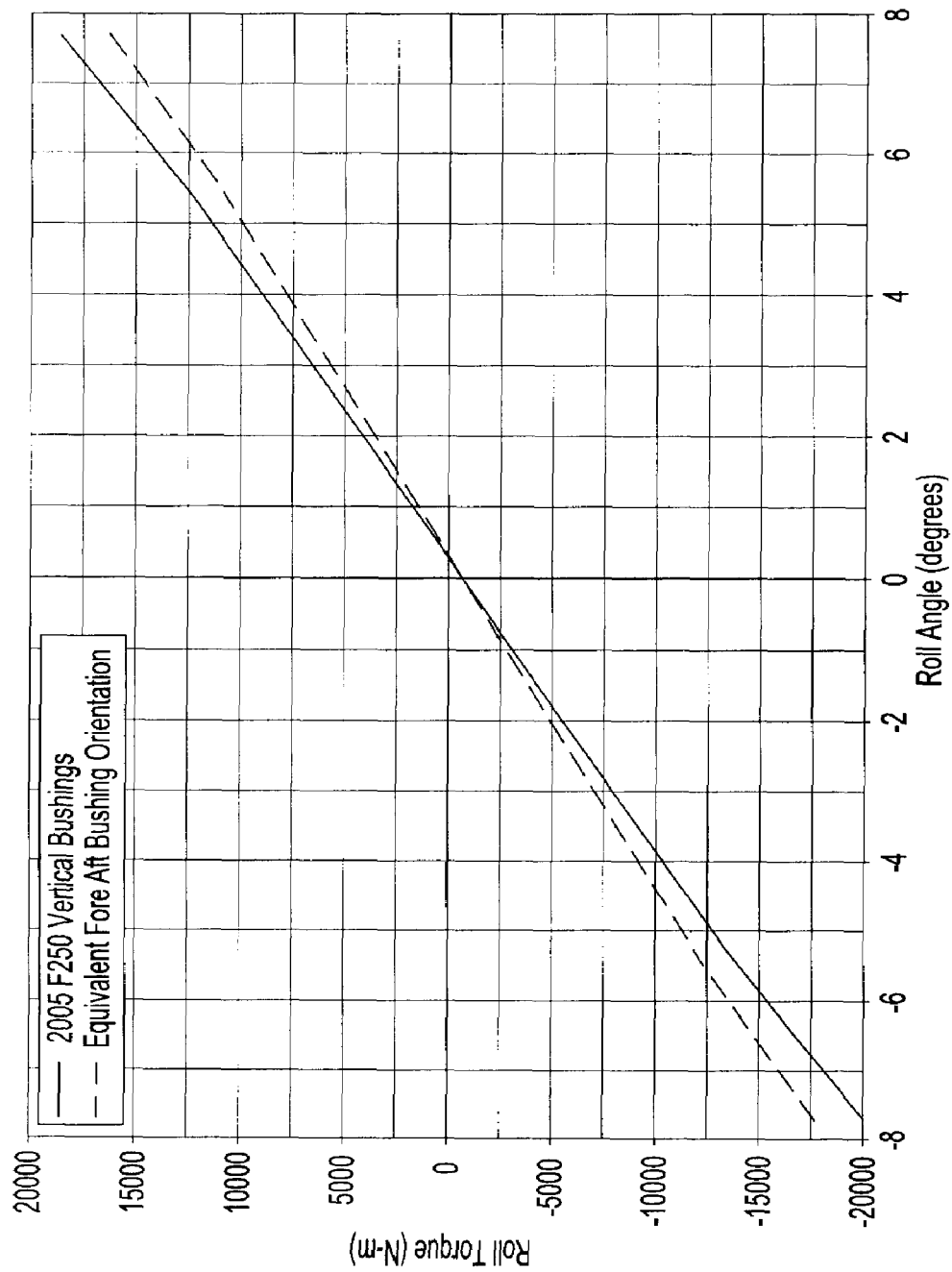
FIG. 5 is a graph comparing roll torque to roll angle of a suspension system having a fore/aft bushing orientation compared to applicants' vertical bushing orientation.

Referring to FIG. 5, a plot comparing a bushing arrangement having the disclosed vertical orientation to an equivalent fore/aft bushing orientation wherein the bushings are secured to an axle with one bushing in front of the axle and the other bushing being located behind the axle. The bushing locations of the fore/aft bushings used in the comparison is approximately the same in the fore/aft direction relative to the axle centerline as the vertical spacing of the vertically located bushings. All of the bushings used in the comparison had the same bushing rate. The vertical bushings show an increased roll stiffness for a given bushing rate than the equivalent fore/aft bushings. For example, for a roll angle of 6, the roll torque is approximately 14,000 N-m. While for a roll angle of 6°, the roll torque for an equivalent fore/aft bushing is less than 12,500 N-m.

While the best mode for carrying out the invention has been described in detail, those familiar with the art to which this invention relates will recognize various alternative designs and embodiments for practicing the invention as defined by the following claims.

The invention claimed is:

1. A vehicle suspension system subassembly for supporting a vehicle on an axle, comprising:
   a right radius arm having a first end secured to a frame of the vehicle and a second end forming a bracket, a first bushing and a second bushing secured to the second end of the bracket in vertically spaced relationship to each other and wherein both of the first and second bushings are disposed on a first side of the axle on a longitudinal side of the axle;
   a left radius arm having a first end secured to the frame of the vehicle and a second end forming a bracket, a first bushing and a second bushing secured to the second end of the bracket in vertically spaced relationship to each other and wherein both of the first and second bushings are disposed on a first side of the axle on a longitudinal side of the axle;
   a right axle connection structure connected to a right side of the axle and secured to the first and second bushings of the right radius arm;
   a left axle connection structure connected to a left side of the axle and secured to the first and second bushings of the left radius arm; and
   a track bar extending from the axle to the frame of the vehicle from a location proximate a first end of the axle to a location proximate the a second end of the axle that is opposite the first end and generally transversely relative to the vehicle.

2. The subassembly of claim 1 wherein the right and left radius arms each include first and second cup shaped elongated half arms that are assembled together in a clam shell manner to define a hollow elongated arm.

3. The subassembly of claim 2 wherein the brackets on the second ends of the right and left radius arms include one flange on the first half arm and one flange on the second half arm.

4. The subassembly of claim 1 wherein the track bar is disposed on a second side of the axle on the opposite longitudinal side from the first side thereof.

5. The subassembly of claim 1 wherein the track bar is connected on a first end to the frame through a first bushing and is connected on a second end to the axle through a second bushing.

6. A radius arm for a front axle suspension of a vehicle having an axle that is connected by the radius arm to a frame element of the vehicle at a location that is spaced in a rearward direction relative to the axle, the axle having a connector extending rearwardly from the axle and having a receptacle in which a pair of bushings are retained in a vertically aligned relationship behind the axle, the bushings each having a central bore through which a fastener is inserted, the radius arm comprising:
   an elongated arm having a forward end and a rearward end;
   a bracket provided at the forward end of the arm defining a an axle connector in which the pair of bushings are assembled and having upper and lower vertically aligned fastener receptacle bores through which the fasteners extend to secure the bushings within the axle connector; and
   a frame bushing provided at the rearward end of the arm that is adapted to connect the rearward end of the arm to the frame of the vehicle.

7. The radius arm of claim 6 wherein the elongated arm is formed as a two part clam shell structure formed on sheet metal fabricated half shells that are welded together to form a hollow space within the arm.

8. The radius arm of claim 7 wherein the half shells are welded together about their outer edges to seal the hollow space within the arm.

9. The radius arm of claim 6 wherein the axle connector defines a clevis.

10. The radius arm of claim 6 wherein the elongated arm is formed as a two part clam shell structure formed on sheet metal fabricated half shells and the axle connector is integrally formed as a clevis with a first flange of the clevis being provided by one of the half shells and a second flange of the clevis being formed by the other of the half shells.

11. In combination, a longitudinally extending radius arm and an axle having a central axis, the combination comprising:
   an axle tube;
   a connection structure secured to the axle tube;
   an elongated body;
   a frame connector at a first end of the body;
   an axle connector at a second end of the body;
   a pair of bushings secured to the connection structure and to the bracket axle connector, the bushings being disposed on the same fore-and-aft side of the central axis of the axle and being vertically spaced relative to each other.

12. The combination of claim 11 wherein the body and axle connector are disposed on one side of the axle and do not extend longitudinally beyond the central axis of the axle.

13. The combination of claim 12 wherein the bushings are connected to the axle connectors by fasteners that are oriented parallel to the central axis of the axle and are vertically aligned with one of the bushings being disposed at a greater height than the central axis and the other bushing being disposed at a lower height than the central axis.

14. The combination of claim 11 wherein the bushings each have a central bore through which a fastener is inserted to secure the axle connector to the frame connector, the central bores being parallel to the central axis of the axle and forming a triangular supporting array on one side of the axle, wherein no part of the triangular supporting array extends directly below or directly above the central axis.

15. The combination of claim 11 wherein the frame connector includes a bushing that has a central bore for receiving a fastener that is adapted to connect the first end of the body to the frame of the vehicle.

16. The combination of claim 11 wherein the bushings are connected to the brackets by fasteners that are oriented parallel to the central axis of the axle and the frame connector includes a bushing that has a central bore for receiving a fastener that is adapted to connect the first end of the body to the frame of the vehicle, wherein the central axis of the axle, the axis of the fasteners that connect the bushings to the axle connectors and the arms of the central bore of the bushing that connects the first end of the body to the frame are arranged in a quadrilateral array on one side of the axle.

* * * * *